(12) United States Patent
Tranchand et al.

(10) Patent No.: US 8,643,322 B2
(45) Date of Patent: Feb. 4, 2014

(54) POWER SUPPLY WITH ADAPTED OUTPUT VOLTAGE

(75) Inventors: Alain Tranchand, La Balme de Sillingy (FR); Bruno Lambersend, Bonneville (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 13/265,040

(22) PCT Filed: Apr. 22, 2010

(86) PCT No.: PCT/IB2010/051769
§ 371 (c)(1),
(2), (4) Date: Oct. 18, 2011

(87) PCT Pub. No.: WO2010/122513
PCT Pub. Date: Oct. 28, 2010

(65) Prior Publication Data
US 2012/0032626 A1  Feb. 9, 2012

(30) Foreign Application Priority Data

Apr. 22, 2009 (FR) .................................. 09 01942

(51) Int. Cl.
*H02P 1/00* (2006.01)
(52) U.S. Cl.
USPC .............................. 318/504; 307/39; 307/126
(58) Field of Classification Search
USPC .............. 318/287, 256, 267, 468, 568.1, 264, 318/265, 266, 466, 467, 280
See application file for complete search history.

(56) References Cited

U.S. PATENT DOCUMENTS

| 5,391,971 | A | * | 2/1995 | Yamada et al. | 318/778 |
| 5,402,047 | A | * | 3/1995 | Bresson et al. | 318/287 |
| 5,818,708 | A | * | 10/1998 | Wong | 363/89 |
| 5,990,646 | A | * | 11/1999 | Kovach et al. | 318/468 |
| 6,182,455 | B1 | * | 2/2001 | Kikuyama | 62/181 |
| 7,129,662 | B2 | | 10/2006 | D'ayot | |
| 2007/0069807 | A1 | * | 3/2007 | Ho | 327/541 |
| 2007/0132413 | A1 | * | 6/2007 | Mays | 318/280 |
| 2007/0252542 | A1 | * | 11/2007 | Gauthier et al. | 318/254 |
| 2007/0273341 | A1 | * | 11/2007 | Shimizu | 323/224 |

FOREIGN PATENT DOCUMENTS

| EP | 0576370 A | 12/1993 |
| EP | 1626154 A | 2/2006 |
| EP | 1837972 A | 9/2007 |
| FR | 2920060 A | 2/2009 |
| JP | 2006--304569 A | 11/2006 |
| JP | 2006304569 A | * 11/2006 |

* cited by examiner

*Primary Examiner* — Eduardo Colon Santana
*Assistant Examiner* — Bickey Dhakal
(74) *Attorney, Agent, or Firm* — Frommer Lawrence & Haug LLP; Ronald R Santucci

(57) ABSTRACT

A home automation actuator (100) comprising a motor (101) for maneuvering a mobile element in a building, a command receiver (108), a control unit (110), a single output converter (120), at least one switching member (104) intended to supply power to the motor, characterized in that the switching member and the input of a regulator (150) are directly connected to the output of the converter whereas the control unit and the command receiver are connected to the output of the regulator and that it comprises a control means (139) for controlling a first reduced level of the output voltage of the converter, which can be activated by the control unit, this first reduced level being lower than a minimum voltage for activating the switching member.

16 Claims, 2 Drawing Sheets

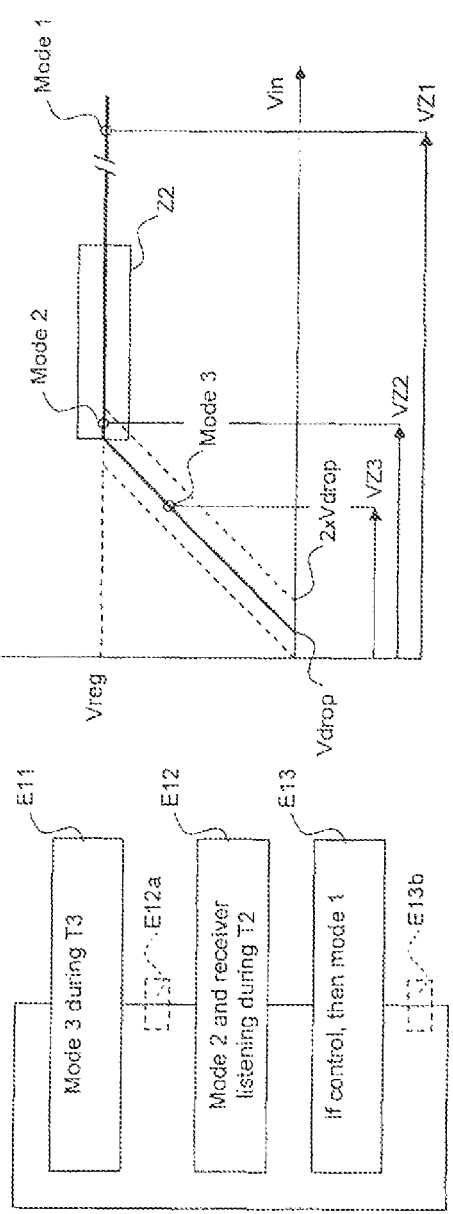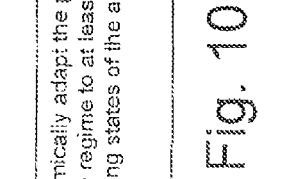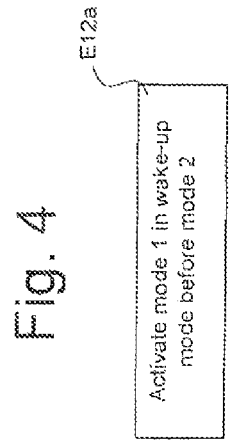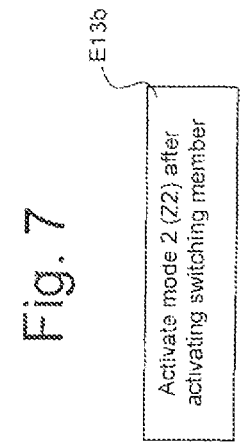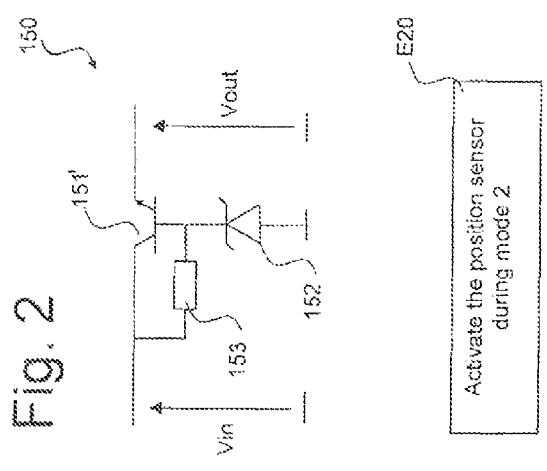

POWER SUPPLY WITH ADAPTED OUTPUT VOLTAGE

This application is a 371 of PCT/IB2010/051769 filed on Apr. 22, 2010, published on Oct. 28, 2010 under publication number WO 2010/122513, which claims priority benefits from French Patent Application Number 09 01942 filed Apr. 22, 2009, the disclosure of which is incorporated herein by reference.

The invention relates to a motorized home automation actuator and to a method for powering and controlling the actuator. The actuator makes it possible to move a mobile element such as a door, a roller blind, a lock, a ventilation hatch, a blind, etc.

A power supply and control circuit is connected to the AC mains and, in addition to a motor, the actuator comprises a number of control devices: in particular, a control unit such as a microcontroller, a command receiver, for example of radiofrequency type, and a switching member to control the power supply to the motor, for example a relay. Moreover, the actuator may also include a position and/or displacement sensor device.

BACKGROUND OF THE INVENTION

It is important to reduce the power consumed by these devices in the periods when the actuator is not executing a movement command. In practice, these movements are generally of a short duration (for example less than 2 minutes per day for a roller blind) and the power absorbed by the motor represents a low energy compared to the energy that can be dissipated by the control devices. For a power absorbed from the mains by the motor that is assumed to be equal to 90 watts, the consumption over a day is: 90×2/60=3 watt hours, and therefore a little over 1 KWh per year. If the average consumption of the control devices is assumed to be equal to 1 watt when they are awaiting a movement command, it is then 24 watt hours that are consumed per day, and therefore close to 10 KWh per year. This discrepancy is unacceptable. Furthermore, both the current and future standards stipulate that the consumption of control devices should be drastically reduced when they are in a standby mode, for example awaiting a movement command.

DESCRIPTION OF THE PRIOR ART

The patent application FR 2920060 describes an energy-saving device for equipping a domestic electrical appliance such as a washing machine or a cooking range. This device includes a regulator upstream of which are arranged a limiting circuit and a high current circuit in parallel. Depending on the activity mode (on or standby), a control circuit activates or does not activate the high current circuit, so as to save energy in standby mode.

The patent application EP 1837972 describes a power supply circuit for an electronic device such as a television comprising a tuner requiring a higher DC voltage than the microcontroller managing the television. The power supply circuit comprises an AC/DC converter with two outputs. In normal operation, a first output delivers a voltage V1 that is sufficient to power the tuner and the upstream side of a regulator, whereas a second output delivers a voltage V2. These two voltages are applied to the anodes of two diodes with common cathodes, then being used to power the microcontroller. The voltage V2 is slightly higher than the output voltage of the regulator, which has the effect of blocking the diode placed at the output of the regulator: in normal operation, it is therefore the second output of the converter which powers the microcontroller. In standby mode, the microcontroller acts on a control circuit linked to the converter and provoking a reduction of the voltages V1 and V2. This time, the voltage V2 is lower than the output voltage of the regulator, and it is therefore the regulator which powers the microcontroller.

The patent application JP 2006-304569 describes a power supply circuit for a device such as a printer or a photocopier including a motor. The circuit comprises a switched-mode regulator whose operation is adjusted using an optocoupler, so as to alternately obtain a first output voltage (for example 24 V) in operating mode and a second output voltage (for example 8 V) in standby mode. Thus, the losses in a DC/DC converter are reduced. Moreover, the circuit includes a device for automatically cutting off the load when the voltage is that of the standby mode.

The reduction in the output voltage is obtained by acting on a voltage reference integrated circuit.

The patent EP 0 576 370 describes a power supply device for a motor for displacing a blanking element. This device comprises a power supply that can supply an adjustable voltage to a motor powered by a DC-DC converter, in order to vary the speed of the motor. In standby mode, the power supply supplies a reduced voltage to avoid a power supply runaway situation.

The U.S. Pat. No. 6,182,455 describes an apparatus for controlling a refrigerated chamber comprising a ventilation motor that can be powered by different voltage levels from a converter.

The patent EP 1 626 154 describes a home automation actuator to which the invention could be applied. This home automation actuator includes a relay- or transistor-based switching member.

SUMMARY OF THE INVENTION

The aim of the invention is therefore to reduce the consumption in standby mode, and in certain operating phases, of a home automation actuator comprising a power supply converter, simply called "converter". The converter is used to power a number of elements situated downstream of the converter, in particular electronic actuator control and/or switching and/or radio reception means. The consumed power concerned is not the power consumed by the converter itself but the power consumed by the elements situated downstream of this converter. In particular, a reduction of this power in standby mode is obtained by reducing the output voltage of the converter, value by which the various standby currents are multiplied to determine the power consumed in standby mode.

Similarly, the invention makes it possible to reduce the power consumed by the actuator during certain operating phases by dynamically adapting the output voltage of the converter to the nature or to the state of the elements situated downstream of the converter.

For economic and technical reasons, a single AC/DC converter is used to transform the AC voltage of the AC mains into a substantially DC voltage of low value which can be used by the different control devices. However, these devices do not all have the same operating voltage. For example, an economical relay requires a winding voltage equal to 12 V (and therefore requires a lower current than a relay with a lower nominal voltage), whereas a Hall effect position sensor operates between 4 and 18 volts, a radiofrequency receiver requires 3 volts, while a microcontroller can even operate at 2 volts.

These values are obviously subject to change depending on the component families and technological advances. Moreover, it is often problematic to directly power a radiofrequency receiver by a switched-mode AC/DC converter: this is reflected in a loss of sensitivity of the receiver. There is then a benefit to be obtained in inserting a linear regulator, acting as a buffer, between the converter and the radiofrequency receiver. The thrust for the technical-economical optimum is therefore generally to have a voltage regulator at the output of an AC/DC converter. Upstream of the regulator, the switching member and the sensor are powered, and downstream of the regulator, the command receiver and the microcontroller are powered.

It is therefore more often than not the switching member which determines the output voltage of the converter, and therefore the value by which the various standby currents are multiplied to determine the power consumed in standby mode. It is obvious that a high nominal voltage for the switching member greatly penalizes this power, which is all the more regrettable since the switching member itself consumes nothing in standby mode.

The invention enhances the devices of the prior art in that it uses a power supply and control circuit with one or two reduced voltage levels. This circuit is obtained by adding a single component or two components to a converter of the prior art, which makes it possible to very simply modify existing actuator ranges in order to obtain optimized operation in standby mode.

The home automation actuator according to the invention comprises a motor for maneuvering a mobile element in a building, a command receiver, a control unit, a single output converter, and at least one switching member intended to supply power to the motor. It is characterized in that the switching member and the input of a regulator are directly connected to the output of the converter whereas the control unit and the command receiver are connected to the output of the regulator and in that it comprises a control means for controlling a first reduced level of the output voltage of the converter, which can be activated by the control unit, this first reduced level being lower than a minimum voltage for activating the switching member.

The home automation actuator according to the invention may comprise a control means for controlling a second reduced level of the output voltage of the converter, this second reduced level being lower than the first reduced level.

According to the invention, the control means for controlling a reduced level may link the anode of a Zener diode, the cathode of which is connected to a control input of the converter, to an electric ground of the converter.

The home automation actuator according to the invention may comprise a means for short-circuiting the regulator between its input and its output.

According to the invention, the first reduced level may be equal to or greater than the threshold voltage of the regulator.

According to the invention, the second reduced level may be lower than the threshold voltage of the regulator.

The control unit according to the invention may include a timer, an operating voltage of which is lower than a nominal voltage of the command receiver.

According to the invention, the second reduced level may be equal to the minimum operating voltage of the timer.

According to the invention, an output of the timer may constitute the control means for controlling the second reduced level of the output voltage of the converter.

According to the invention, the converter may be of AC-DC step-down type.

According to the invention, the converter may be of DC-DC type.

According to the invention, the switching member may comprise a relay or a triac if the motor is of AC induction type and the switching member may comprise an inverter if the motor is of brushless permanent magnet type.

According to the invention, the method for powering and controlling a home automation actuator as defined previously comprises a dynamic adaptation of the output voltage level of the converter to a state of the actuator.

The method according to the invention may comprise, in succession, a sleep step, a listening step and an operating step if a control signal is detected during the listening step, each step defining a state of the actuator, and in which the output voltage of the converter may be equal to a voltage allowing for the activation of the switching member during the operating step.

In the method according to the invention, during the sleep step, at least one of the following operations may take place:
 powering the control method with a power supply voltage lower than the minimum power supply voltage of the command receiver; and
 not powering a position sensor of the actuator.

DESCRIPTION OF THE DRAWINGS

FIG. 2 represents a known embodiment of a regulator contained in the actuator.

FIG. 3 graphically represents a transfer characteristic of the regulator, showing an operating mode, a listening mode and a standby mode of the actuator.

FIG. 4 represents a method for powering and controlling the actuator.

FIG. 5 represents a first variant of the method.

FIG. 6 represents a variant of a control unit of the actuator.

FIG. 7 represents a second variant of the method.

FIG. 8 represents a third variant of the method.

FIG. 9 represents a fourth variant of the method.

FIG. 10 represents a single step describing the method.

DESCRIPTION OF THE PREFERRED EMBODIMENT

Figure 1:
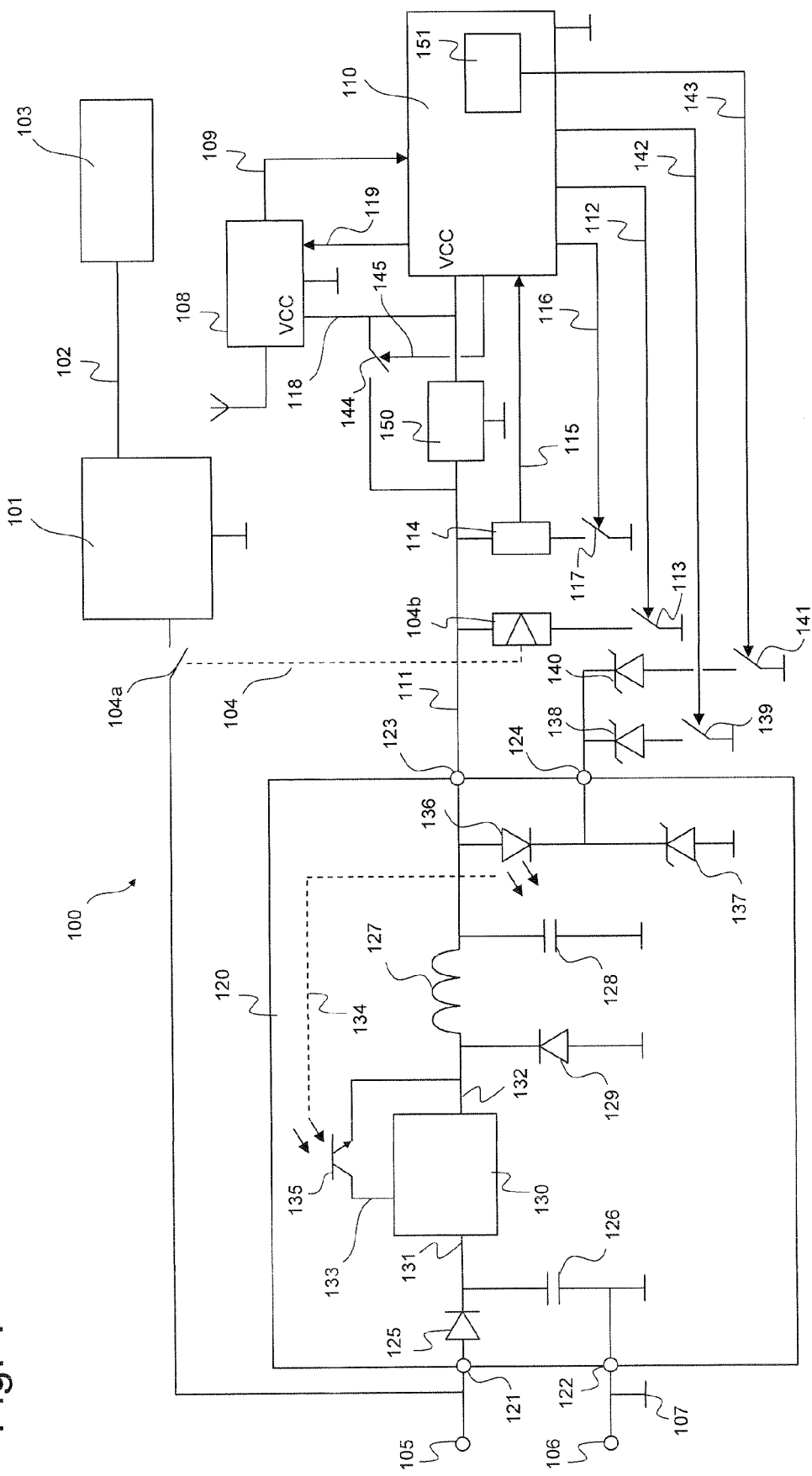
FIG. 1 represents a motorized home automation actuator according to the invention.

FIG. 1 represents a motorized home automation actuator 100 according to the invention. The actuator comprises an electric motor 101 whose output shaft 102 drives a reduction gear 103. An output of the reduction gear drives a home automation load which is not represented, such as a mobile element in a building.

The electric motor is connected to a first conductor 105 of an electrical source, for example, the phase conductor of an AC network, by a first controlled switch 104a of a relay 104 used as switching member. Alternatively a triac is used as switching member. The electric motor is also connected to a second conductor 106 of the electrical source, for example the neutral conductor of the AC network, serving as electrical ground 107 for the actuator as a whole.

The motor is of AC induction type. Alternatively, it is of direct current and commutator type or else of brushless permanent magnet type. In this case, the switching member is, for example, a three-phase inverter.

The invention is described in the case of an AC electrical source, but the electrical source may also be a DC source, for example a storage battery fed by a photovoltaic panel.

The actuator comprises a command receiver 108, preferably of radiofrequency type, a signal output 109 of which is connected to a control unit 110 such as a microcontroller provided with digital and/or analog inputs and outputs.

Alternatively, the command receiver is of infrared type or of "bearer current" type.

A first control line 112 connects the control unit to the control of a second controlled switch 113 connected between the electrical ground and one end of the winding 104b of the relay 104, the other end of which is connected to a first power supply line 111.

A second control line 116 connects the control unit to the control of a third controlled switch 117 connected between the electrical ground and a power supply end of a position sensor 114, the other end of which is connected to the first power supply line. A sensor output line 115 links an output of the position sensor 114 to the control unit.

A second power supply line 118 is arranged at the output of a regulator 150, the input of which is connected to the first power supply line 111. This second power supply line is connected to the VCC power supply inputs of the command receiver and of the control unit.

A third control line 119 connects the control unit to a control for activating the command receiver. Depending on the active or inactive state of this control line, the command receiver is in listening mode, in which it is capable of receiving an external signal, or in sleep mode, in which it consumes little or no energy.

The actuator comprises a converter 120, of AC/DC step-down type, which has a first power supply terminal 121 connected to the first conductor of the AC mains, a second power supply terminal 122 connected to the second conductor of the AC mains and to the electrical ground, an output terminal 123 linked to the first power supply line and a control terminal 124.

A rectifying diode 125 and a filtering capacitor 126 are arranged in series between the first and second power supply terminals. The point common to these two components is connected to the input 131 of a chopper 130, the output 132 of which is connected on the one hand to an inductance 127 in series with an output capacitor 128, and on the other hand to the cathode of a free-wheeling diode 129, the anode of which is linked to the electrical ground. The common point between the inductance and the output capacitor is linked to the output terminal of the converter.

The converter also contains an optocoupler 134, the transistor 135 of which has its collector linked to an enabling terminal 133 of the chopper 130 and its emitter linked to the output of the chopper. When the transistor 135 conducts, the chopper 130 becomes open. The LED 136 of the optocoupler has its anode linked to the output terminal and its cathode linked to the cathode of a first Zener diode 137, the anode of which is linked to the electrical ground. The LED therefore has a current passing through it as soon as the output voltage of the converter exceeds the sum of the conduction thresholds of the Zener diode and of the LED. The chopping of the chopper is therefore regulated by the output voltage.

This AC-DC converter structure is typical of a step-down converter, as used in actuators of the prior art.

In the case of a DC electrical source, the converter is of DC-DC type and does not include the rectifying diode. It may have, depending on the situation, a similar structure, of step-up type.

A fourth control line 142 connects the control unit to the control of a fourth controlled switch 139 connected between the electrical ground and the anode of a second Zener diode 138, the cathode of which is linked to the cathode of the first Zener diode via the control terminal 124.

Similarly, a fifth control line 143 connects the control unit to the control of a fifth controlled switch 141 connected between the electrical ground and the anode of a third Zener diode 140, the cathode of which is linked to the cathode of the first Zener diode via the control terminal.

VZ1, VZ2 and VZ3 are used to designate the respective Zener voltages of the three Zener diodes 137, 138 and 140. VZ1>VZ2>VZ3. If a number of Zener diodes are arranged in parallel, it is the one with the lowest Zener voltage which sets the output voltage of the converter.

The converter is used to power a number of elements situated downstream of the converter, in particular the control unit of the actuator and the command receiver (via the regulator) and the switching member (directly).

The control unit contains an internal timer 151, an output of which changes state for the duration of a time delay. This internal timer, with very low consumption, is powered by the VCC power supply voltage of the control unit. It may, however, operate at a power supply voltage lower than the nominal power supply voltage of the control unit. These aspects will be explained in detail later with reference to FIG. 6. The output of the internal timer is connected to the fifth control line 143. Thus, this control line becomes active (and closes the controlled switch 141) for the duration of a time delay of the internal timer.

The control unit may consist of a microcontroller containing an internal timer. If this microcontroller contains digital outputs of open collector or open drain type, then these outputs do away with the controlled switches linked to each control line. In particular, the anode of the second Zener diode 138 becomes directly linked to the fourth control line 142, and the anode of the third Zener diode 140 becomes directly linked to the fifth control line 143.

A sixth control line 145 links the control unit to the control of a sixth controlled switch 144 arranged between the input and the output of the regulator 150.

FIG. 2 represents a known embodiment of a regulator contained in the actuator. The regulator 150 uses this simple linear regulator configuration, comprising an NPN bipolar transistor 151', a regulator Zener diode 152 arranged between the base of the transistor and the electrical ground, and a bias resistor 153 arranged between the collector of the transistor and its base. The input of the regulator is taken from the collector of the transistor and the output of the regulator is taken from its emitter. Alternatively, an integrated regulator is appropriate, provided that its operating mode is perfectly specified by its manufacturer, including in the case of an input voltage lower than the normal operating range. Preferably, the regulator is of low drop-out type, as described, below.

FIG. 3 graphically represents a transfer characteristic of the regulator 150, that is to say, its output voltage Vout as a function of its input voltage Vin. If the Zener diode is assumed to be ideal and the base-emitter voltage of the transistor to be equal to 0.6 V when the base-emitter junction conducts, this characteristic is simply offset by 0.6 V relative to the first bisector (Vout=Vin−0.6 V) as long as the Zener diode is not conducting. This offset is described as drop-out voltage Vdrop. A value of 0.6 volts is considered to be a low drop-out voltage value, since this value can be as high as or exceed 2 volts in certain regulators.

As soon as the Zener diode 152 conducts, maintaining a voltage VZ at its terminals, the output voltage remains constant at VZ−0.6, called regulated voltage Vreg. The threshold voltage of the regulator at the input is said to be equal to the sum of the regulated output voltage Vreg and the drop-out voltage Vdrop, here equal to 0.6 V.

This figure shows the points representative of an operating mode (mode 1), of a listening mode (mode 2) and of a sleep mode (mode 3) of the actuator.

In the operating mode, the fourth and fifth control lines (respectively 142 and 143) are not activated by the control unit. The output voltage of the converter is therefore set by the first Zener diode and equal to VZ1, to within the voltage at the terminals of the LED.

This voltage is sufficient to power the switching member, normally equal to the nominal power supply value thereof, for example 12 V.

In the listening mode, the fourth control line 142 is activated and the second Zener diode 138 comes in parallel with the first Zener diode. That is the one which sets the output voltage, equal to VZ2, to within the voltage at the terminals of the LED. There is then an output voltage of the converter slightly higher than the minimum operating voltage of the regulator when it supplies a constant voltage.

If the radiofrequency receiver has a nominal power supply voltage of 3 volts, then the regulated output voltage Vreg of the regulator is taken at 3 volts. The minimum input voltage of the regulator is then 3.6 volts. In mode 2, the output voltage of the converter is therefore taken slightly above 3.6 V. Preferably, this voltage will be taken from a range between the threshold voltage and the threshold voltage plus the drop-out voltage. However, a wider range may be appropriate while representing a significant advance over the prior art. For example, a voltage of 4.0 volts will be chosen if this voltage corresponds to the operating minimum of the position sensor. This operating range can be expressed as a function of the regulated voltage: for example, the input voltage of the regulator in mode 2 must not exceed the minimum voltage by more than one times the value of the regulated voltage thereof, as is represented by an area Z2 of width Vreg indicating a possible excursion of the input voltage in mode 2, for example between 3.6 and 6.6 volts with the above values.

In the sleep mode, the fifth control line 143 is activated and the third Zener diode 140 comes in parallel with the first Zener diode. That is the one that sets the output voltage, equal to VZ3, to within the voltage at the terminals of the LED. This value VZ3 is such that the input voltage of the regulator is lower than its threshold voltage.

The output voltage of the regulator is then simply equal to the output voltage of the converter, minus the drop-out voltage. This voltage is insufficient to allow the radiofrequency receiver to operate, but remains sufficient to ensure the operation of the control unit in a standby mode.

FIG. 4 represents a power supply and control method for the activator.

In a first step E11, the actuator is in sleep mode. In this mode, the control unit is powered at very low voltage, for example 2 volts, and can simply maintain its control outputs in a previously defined state, without running a program. The first, second and third control lines are in the inactive state. Only the fourth and fifth control lines have been placed in an active state before the transition to this mode. The power supply voltage is set by the third Zener diode (140).

Similarly, the internal timer 151 remains active, so as to be able to count down a sleep time delay T3. Because the third control line is in the inactive state, the radiofrequency receiver consumes no current.

A second step E12 is activated by the end of the sleep time delay. Specifically, the internal timer acts directly on the state of the output of the control unit connected to the fifth control line, deactivating the latter. The power supply voltage this time becomes set by the second Zener diode, for example 3.6 volts. Because of this, the voltage on the second power supply line becomes equal to 3 volts, which corresponds to the nominal operating voltage of the radiofrequency receiver and to the nominal operating voltage of the rest of the control unit.

The actuator, and in particular its command receiver, switches to listening mode, for a duration T2 which this time is set by a normal timer of the microcontroller. In listening mode, the third control line is activated, either for the entire duration of the listening mode, or for short time intervals which enable the command receiver to detect the presence of a signal and are separated by intervals that are predetermined according to the structure of a signal frame.

In a third step E13, the operating mode is activated in the presence of a signal, that is to say the control unit switches the fourth control line to the inactive state. The output voltage of the converter this time is set by the first Zener diode, for example 12 volts, which allows the switching member to be powered.

In operating mode, the movement command is executed. Once the command is executed, there is a loop to the first step.

In the absence of any radio signal, or if the radio signal does not contain any movement command, the method goes directly back to the first step.

The command receiver is therefore powered only during brief listening periods T2 separated by longer sleep periods T3. Furthermore, it is possible to power the receiver discontinuously within a listening period. The average energy consumed is therefore reduced both by the fact that a minimum operating voltage is used and by the fact that this power supply is discontinuous.

Furthermore, the average energy consumed is significantly reduced by the use of a second reduced voltage level, lower than the first reduced voltage level, when the actuator is in a sleep mode.

FIG. 5 represents a first variant of the method, in which a first additional step E20 is inserted into the second step E12. This first additional step consists in activating the first control line 116 during the listening mode. The listening mode is therefore exploited to power the position sensor and proceed to acquiring the position signal. Thus, the position sensor is itself powered during the listening mode, at the minimum voltage set by the second Zener diode. A movement of the mobile element driven by the actuator can thus be detected, outside of the periods of movement of the actuator. Such a movement may be the action of an anomaly in a brake of the actuator, the action of the wind, or an action manually forced by a user or a child. The position sensor is, moreover, powered during the operating mode.

In a variant embodiment of the actuator, the position sensor may be arranged downstream of the regulator, and therefore powered by the second power supply line.

FIG. 6 represents a variant of the control unit 110, in which the control unit comprises a microcontroller 160 separate from a low-voltage timer 161. The low-voltage timer 161 fulfils the same functions as the internal timer 151. It is powered between the second power supply line 118 and the electrical ground and its output is connected to the fifth control line 143. It can operate at a very low power supply voltage, for example 1.2 volts. The microcontroller 160 comprises the inputs and outputs of the control unit 110 other than the one connected to the fifth control line in FIG. 1. It is connected by a positive power supply input 162 to the second power supply line 118, referenced VCC in the control unit 110, and it is normally connected to the electrical ground by a negative power supply input 163. However, this connection to the electrical ground here is controlled by a transistor 164, the collector of which is linked to the negative power supply input and the emitter of which is linked to the electrical ground. The base of the transistor is linked to the cathode of a first diode 165 arranged in series with a second diode 166, the anode of which is linked to the second power supply line. Assuming one and the same voltage value equal to 0.6 V for the conduction of the diode or transistor PN junctions, there is therefore a connection of the microcontroller to the electrical ground for a voltage VCC greater than or equal to 1.8 volts. For a voltage of 1.2 volts for example, the timer is powered whereas the microcontroller is disconnected and all its outputs are then in a high-impedance state.

If the voltage at the terminals of the LED 136 is not taken into account, the preferred values of the Zener voltages are then VZ1=12 volts, VZ2=3.6 volts and VZ3=1.8 volts to obtain, respectively, 3 volts and 1.2 volts in mode 2 and in mode 3 on VCC.

FIG. 7 represents a second variant of the method, intended to be used primarily in relation to FIG. 6. Because of the complete disconnection of the microcontroller during the mode 3, the fourth control line is not activated during the mode 3. In other words, there is a direct transition to the mode 1 when the fifth control line is deactivated at the end of mode 3. This is what the wake-up step E12a, inserted between the first step E11 and the second step E12, represents. The microcontroller is immediately powered at the regulated voltage. One of the first instructions of an initialization program activated in the wake-up step then consists in activating the fourth control line which makes it possible to switch to mode 2 during the second listening step E12b, similar to the second step E12. The wake-up step is then as brief as possible.

It is of course possible to physically avoid the transition through the mode 1 on leaving the mode 3, by replacing, for example, the controlled switch 139 with a transistor biased by a resistor arranged between the base and the first power supply line 111, and therefore normally conductive, but the base of which is connected to the ground by the controlled switch 139.

Alternatively, the transition through the mode 1 is exploited to power the position sensor, if it cannot be powered during the mode 2 because this sensor needs too high a voltage. The transition through the mode 1 then becomes an advantage.

FIG. 8 represents a third variant of the method, with the insertion of a reduced operation step E13b, after the third step E13. The reduced operation step consists in activating the power supply mode 2 after the activation of the switching member. The output voltage of the converter used in mode 2 is then determined to observe a minimum voltage for holding the switching member in its actived state.

For example, if the holding voltage of a 12-volt relay is equal to 6 volts, then it is this value which is chosen as the output voltage of the converter, in reduced operation. With the relay remaining activated, the motor of the actuator is therefore normally powered during this reduced operation step.

When a switching member and a position sensor are both present, the output voltage of the converter in reduced operation will be the greater of the values of the holding voltage of the switching member and of the minimum operating voltage of the position sensor.

Alternatively, the reduced operation step is split with, in alternation, a first substep for which the output voltage is set by the holding voltage of the switching member and a second substep for which the output voltage is set by the minimum operating voltage of the position sensor, if the latter is substantially greater than the holding voltage. The position sensor is activated (by the controlled switch 117) only during this second substep.

FIG. 9 represents a fourth variant of the method, in which a second additional step E30 is inserted into the first step E13. This second additional step comprises the short-circuiting of the regulator 150 during the operation in mode 3. It is thus possible to further reduce the losses in the regulator. This step is particularly justified if the regulator used has a high dropout voltage.

The invention makes it possible to minimize the energy consumptions by lowering the output voltages of the converter to the maximum and in particular by the use of two reduced voltage levels.

FIG. 10 describes, in a single step E10, a method for operating the actuator according to the invention in its preferred embodiment and in an entirely general way. The single step consists in dynamically adapting the power supply mode to at least three operating states of the actuator.

The Zener diodes used in FIG. 1 have been described in the case of a parallel operation. It is easy for those skilled in the art to provide series circuitry (with other voltage values) or else to combine series and parallel circuitry. It is also possible to use adjustable voltage reference circuitry, as described in the prior art.

The dynamic adaptation may include a large number of thresholds. These can be set by a digital-analog converter arranged in the microcontroller of the control unit, which allows for greater flexibility in their determination in each application case.

The invention claimed is:

1. A home automation actuator comprising a motor for maneuvering a mobile element in a building, a command receiver, a control unit, a single output converter, at least one switching member intended for the power supply to the motor, wherein the switching member and the input of a regulator are directly connected to the output of the converter whereas the control unit and the command receiver are connected to the output of the regulator,
    wherein the home automation actuator is configured such that the operating voltage of the control unit is lower than the minimum power supply voltage of the command receiver during a sleep step,
    and wherein said home automation actuator comprises a control means for controlling a first reduced level of the output voltage of the converter, which can be activated by the control unit, this first reduced level being lower than a minimum voltage for activating the switching member.

2. The home automation actuator as claimed in claim 1, wherein it comprises a control means for controlling a second reduced level of the output voltage of the converter, this second reduced level being lower than the first reduced level.

3. The home automation actuator as claimed in claim 1, wherein the control means for controlling a reduced level links the anode of a Zener diode, the cathode of which is connected to a control input of the converter, to an electric ground of the converter.

4. The home automation actuator as claimed in claim 1, wherein it comprises a means for short-circuiting the regulator between its input and its output.

5. The home automation actuator as claimed in claim 1, wherein the first reduced level is equal to or greater than the threshold voltage of the regulator.

6. The home automation actuator as claimed in claim 1, wherein the converter is of AC-DC step-down type.

7. The home automation actuator as claimed in claim 1, wherein the converter is of DC-DC type.

8. The home automation actuator as claimed in claim 1, wherein the switching member comprises a relay or a triac if the motor is of AC induction type and in that the switching member comprises an inverter if the motor is of brushless permanent magnet type.

9. The home automation actuator as claimed in claim 2, wherein the second reduced level is lower than the threshold voltage of the regulator.

10. The home automation actuator as claimed in claim 2,
wherein the control means for controlling a first reduced level, links the anode of a Zener diode, the cathode of which is connected to a control input of the converter, to an electric ground of the converter, and
wherein the control means for controlling the second reduced level links the anode of another Zener diode, the cathode of which is connected to a control input of the converter, to an electric ground of the converter.

11. The home automation actuator as claimed in claim 2, wherein the control unit includes a timer, an operating voltage is the timer being lower than a nominal voltage of the command receiver.

12. The home automation actuator as claimed in claim 11, wherein the second reduced level is equal to the minimum operating voltage of the timer.

13. The home automation actuator as claimed in claim 11, wherein an output of the timer constitutes the control means for controlling the second reduced level of the output voltage of the converter.

14. A method for powering and controlling a home automation actuator comprising a motor for maneuvering a mobile element in a building, a command receiver, a control unit, a single output converter, at least one switching member intended for the power supply to the motor, wherein the switching member and the input of a regulator are directly connected to the output of the converter whereas the control unit and the command receiver are connected to the output of the regulator,
wherein the operating voltage of the control unit is lower than the minimum power supply voltage of the command receiver during a sleep step,
and wherein said home automation actuator comprises a control means for controlling a first reduced level of the output voltage of the converter, which can be activated by the control unit, this first reduced level being lower than a minimum voltage for activating the switching member, and
wherein the home automation actuator comprises a dynamic adaptation of the output voltage level of the converter to a state of the actuator.

15. The method as claimed in claim 14, which comprises, in succession, a sleep step, a listening step and an operating step if a control signal is detected during the listening step, each step defining a state of the actuator, and in which the output voltage of the converter is equal to a voltage allowing for the activation of the switching member during the operating step.

16. The method as claimed in claim 14, wherein, during said sleep step, at least one of the following operations is performed:
powering the control unit with a power supply voltage lower than the minimum power supply voltage of the command receiver; and
not powering a position sensor of the actuator.

* * * * *